Figure 5:
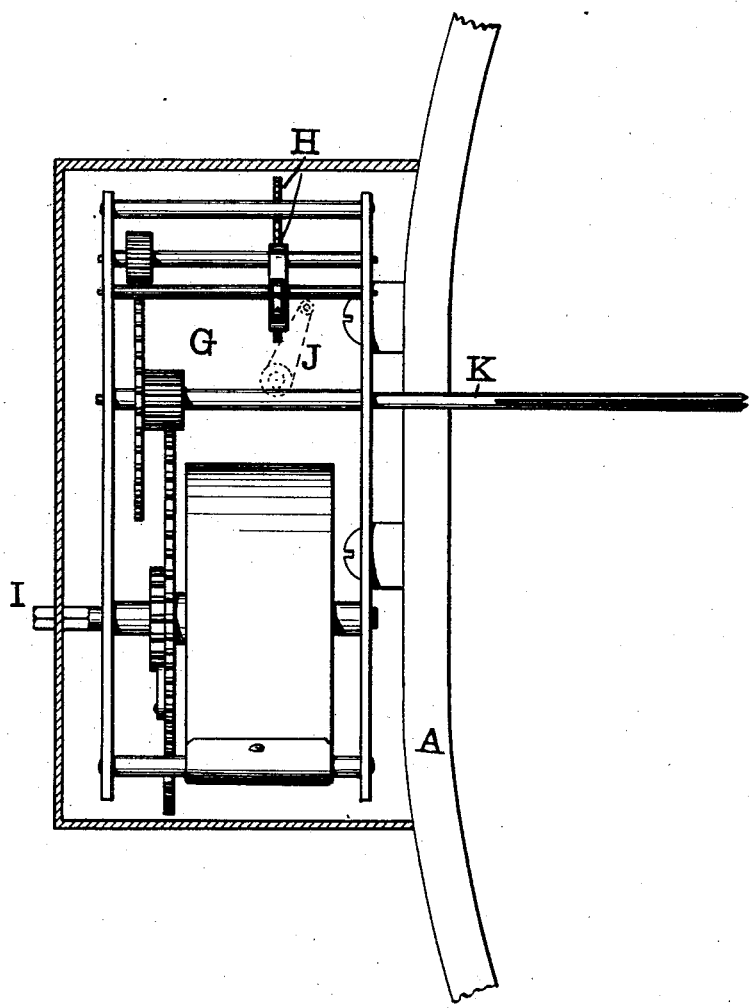

(No Model.) 2 Sheets—Sheet 1.
C. M. GIDDINGS.
RECORDING DYNAMOMETER.
No. 361,689. Patented Apr. 26, 1887.
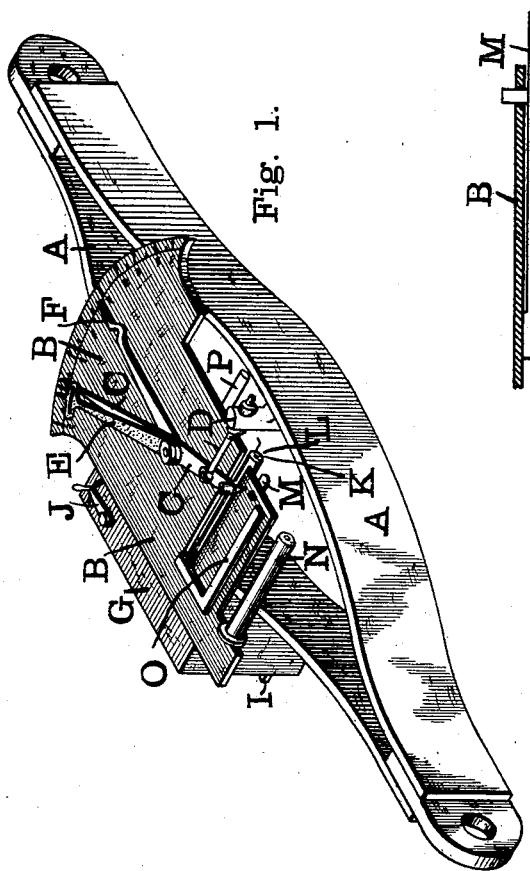
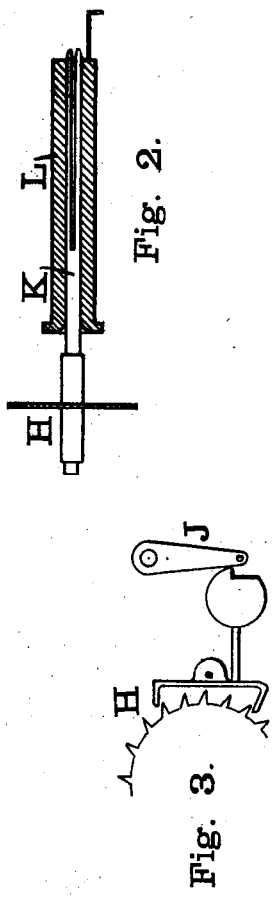
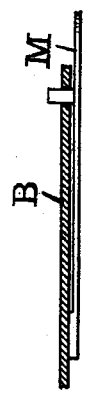
Witnesses:
J. W. Snyder
W. A. Seward
Charles M. Giddings
Inventor
by James W. See.
Attorney
N. PETERS, Photo-Lithographer, Washington, D. C.

(No Model.) 2 Sheets—Sheet 2.

C. M. GIDDINGS.
RECORDING DYNAMOMETER.

No. 361,689. Patented Apr. 26, 1887.

WITNESSES:
W. A. Seward
G. N. Clapp

Charles M. Giddings
INVENTOR
by James W. See
ATTORNEY

N. PETERS. Photo-Lithographer, Washington, D. C.

UNITED STATES PATENT OFFICE.

CHARLES M. GIDDINGS, OF MASSILLON, OHIO.

RECORDING-DYNAMOMETER.

SPECIFICATION forming part of Letters Patent No. 361,689, dated April 26, 1887.

Application filed December 13, 1886. Serial No. 221,375. (No model.)

*To all whom it may concern:*

Be it known that I, CHARLES M. GIDDINGS, of Massillon, Stark county, Ohio, have invented certain new and useful Improvements in Dynamometers, of which the following is a specification.

This invention pertains to dynamometers for measuring and recording tractive strains, and relates particularly to an instrument devised for use in connection with traction-engines and loads to be moved by them.

The improvements will be readily understood from the following description, taken in connection with the accompanying drawings, in which—

Figure 1 is a perspective view illustrating my improved dynamometer; Fig. 2, a longitudinal section through the driving paper-drum; Fig. 3, an elevation of a portion of the clock-work; Fig. 4, a vertical transverse section through that portion of the dial-plate disposed between the paper-drums and showing the arrangement of the paper-retaining spring; and Fig. 5, a horizontal section of the box containing the clock-work, showing the clock-work and a portion of one of the spring-blades.

In the drawings, A indicates the two blades of an elliptic spring, having their opposite ends united and provided with link-eyes for draft attachment; B, a flat plate rigidly secured to one blade of this spring and bearing a segmental line of graduations, this plate lying across the face of the two spring-blades, but connected only to the one to which it is attached; C, a pointer pivoted at a point intermediate in its length to a stud projecting from the plate, the longer end of the pointer indexing the graduations upon the plate, while the shorter end carries a pencil whose point is contiguous to the surface of the plate; D, a stud rigidly attached to that blade of the spring to which the plate is not attached, the stud being connected by a link adjustable in length by nuts, as shown, to the pointer C; E, a pointer, termed the "averaging-pointer," freely pivoted upon the same stud with the pointer C and similarly indexing the graduations of the plate, the pointer E having near its free extremity a segmental slot of limited length, in which plays a pin projecting upward from the pointer C; F, a maximum pointer pivoted to the stud on which the other pointers oscillate and similarly indexing the graduations of the plate, this pointer being moved in one direction by means of the pin in the end of the pointer C coming in contact with it, the pointer C fitting upon its pivot with sufficient friction to be maintained against displacement by ordinary jarring in working; G, a box containing clock-work, rigidly secured against that blade of the spring to which the plate is attached, the clock-work being of ordinary description, adapted to produce rotation of mechanism by means of a winding-up spring; H, portions of the clock-work; I, a winding-post of the clock-work by which the spring is wound up; J, a finger-piece exterior to the box, projecting within the box and adapted to serve in throwing an impediment in the path of some part of the clock-work; K, a spindle rotated by the clock-work, projecting from the box inward under the plate; L, a cylindrical paper-drum, fitted to be slipped upon the spindle K, the drum having a longitudinal saw-cut to receive the end of a strip of paper, and the spindle having a split to form a spring fitted within the paper-drum, which has a pin across its bore to engage the slot of the spindle, whereby the drum is forced to revolve with the spindle; M, a finger-spring secured below the plate in front of the paper-drum, and provided with a guide-peg projecting upward through the plate, as clearly shown in Fig. 4; N, a spool fitted to revolve loosely upon a pin secured to the plate, this spool lying parallel with the paper-drum, and being adapted to receive a roll of paper; O, a guide-finger having its heel secured to the plate and adapted to form an edge guide for a strip of paper moving over the plate, the finger lying a sufficient distance from the plate to permit the passage of paper between; and P, a stud rigidly attached to one of the spring-blades and projecting toward the other, and serving to limit the approach of the blades.

Tensile strain applied to the spring tends to cause the plates to approach each other at their centers, this tendency being resisted and permitted by the rigidity and resilience of the blades. The blades should have a cross-sectional area of suitable proportion to the amount of strain which the instrument is to measure.

The stud P serves to limit the approach of the blades, and thereby prevents the blades being so far collapsed as to result in a permanent set. As the pivot on which the pointer C turns moves inwardly with the movement of one blade, and as the stud and link D move inwardly with the movement of the other blade, and as the inner end of the link carries with it one end of the pointer C, then as the blades approach each other oscillating motion will obviously be imparted to the pointer C, and this pointer will therefore index upon the graduations of the plate the measure of strain upon the instrument. The instrument is to be graduated by applying to it known strains, as by hanging weights to it while in a vertical position, and then permanently graduating the plate into definite readings.

When such an instrument is attached to a moving load and drawn upon by a motor, the strains are almost always of an impulsive character, and consequently the pointer C will be thrown into such rapid oscillations that it will be difficult, if not impossible, to determine within a reasonable degree of accuracy the nature of its indexing. I therefore arrange for a more stable indication of the maximum and average readings. When the instrument is free from strain, the maximum-pointer F is pushed by hand to the left as far as possible. As the pointer C moves under the action of the tractive strains its pin will engage the maximum pointer and push it to the maximum position reached by the pointer C. When the pointer C retreats, the maximum-pointer will remain in the farthest position which it has reached. Maximum strains can thus be easily read.

The segmental slot in the end of the averaging-pointer E should have a length nearly equal to the length of the impulsive vibrations of the pointer C, and I make the pointer E of a color different from that of the other pointers and in strong contrast with the plate. The pointer C will impart different motions of oscillations to the averaging-pointer, but will be capable of limited vibrations without disturbing the averaging-pointer. Average readings may therefore be readily taken from the instrument while the pointer C is in such rapid vibration as to be practically useless for indexing purposes.

A long strip of paper is to be wound upon the spool N, and the end of the paper is to be passed under the finger O, over that portion of the plate lying between the spool and paper-drum, under the point of the pencil, and its end connected with the paper-drum. One edge of the paper runs against the heel of the guide-finger and the other edge against the guide-peg. The plate is slotted just above the paper-drum, so that the paper may be passed to the drum, and that portion of the plate just below the pencil-point serves as a tablet-backing for the paper. By depressing the spool, and consequently the guide-peg, the spool and the paper-drum and the paper may be readily withdrawn from the instrument, the guide-peg serving to guide the paper sidewise, and also, through the medium of the paper, to keep the paper-drum and spool upon their spindles.

The clock-work being wound up, the spindle of the paper-drum will be continuously revolved and the paper will be wound from the spool to the paper-drum, passing under the pencil-point as it moves. The pencil, oscillating with the pointer C, will thus trace upon the moving paper a continuous line indicative of the strains upon the instrument, thus recording upon the paper a diagram from which the strains may be read, the diagram presenting the aspect of a succession of zigzags, due to the impulsive vibrations of the pointer C. The apex of the zigzags indicates the maximum strains, and the mean height of the zigzags will indicate the average strains. A base-line may be traced upon the paper by moving the paper past the pencil when the instrument is not under strain, or the paper may be prepared with a base-line upon it, or the position of the guides may be such that one edge of the paper constitutes the base-line, instruments of this class seldom reading to low values; hence the pencil is not liable to overtravel the zero edge of the paper. The pointer C can be adjusted to the zero of the graduations of the plate by adjusting the link D when the instrument is not under strain.

The clock-work can be stopped and started at any time by manipulating the finger-piece J, which serves to throw an impediment in the path of some part of the clock-work. Thus in Fig. 3 is seen the verge and scape-wheel, the verge having a short pendulum, whose motion may be suppressed by means of the finger-piece.

I claim as my invention—

1. In a dynamometer, the combination of a spring fitted for tractive attachment, a graduated plate, a pivot, a pointer fitted to be oscillated on such pivot by the movements due to strains upon the spring, and an averaging-pointer fitted to oscillate upon said pivot and provided with a slot engaged by the first-mentioned pointer, substantially as and for the purpose set forth.

2. In a dynamometer, the combination of a spring fitted for draft attachment, a graduated plate, a pivot, a pointer pivoted thereon and adapted to be oscillated by the strain movements of the spring, a maximum-pointer with its pivot coincident with the pivot of the first-mentioned pointer and adapted to be moved in one direction by the first-mentioned pointer, and an averaging-pointer with its pivot coincident with the pivot of the other pointers and having a slot engaged by the first-mentioned pointer, substantially as and for the purpose set forth.

3. In a dynamometer, the combination of an elliptic spring fitted for draft attachment, a plate provided with graduations and rigidly secured to one blade of the spring, a pointer pivoted upon the plate and armed with a pencil, a link connecting said pointer with that blade of the spring to which the plate is not attached, a paper drum and spool mounted upon the plate and adapted for the reception of a strip of record-paper, guides for the edges of the paper, a finger for holding the paper down to its tablet-surface, and clock-work secured to that blade of the spring to which the plate is attached, and fitted to revolve the paper-drum, substantially as and for the purpose set forth.

4. In a dynamometer, the combination of an elliptic spring fitted for draft attachment, a graduated plate attached to one blade of the spring, a pointer pivoted to the plate and provided with a pencil and linked to that blade of the spring to which the plate is not attached, a paper-drum, a paper-spool, guides for the paper, clock-work fitted to rotate the paper-drum, and a finger-piece adapted to obstruct the movement of the clock-work, substantially as and for the purpose set forth.

5. In a dynamometer, the combination of spring A, plate B, pointer C, fitted for a pencil, paper-drum K, spool N, box G, clock-work disposed within the said box and fitted to revolve the paper-drum, guide-finger O, and finger-spring M, having a guide-plate, substantially as and for the purpose set forth.

C. M. GIDDINGS.

Witnesses:
A. W. McCallum.
H. J. Westover.